US007616548B2

(12) United States Patent
Saito et al.

(10) Patent No.: US 7,616,548 B2
(45) Date of Patent: Nov. 10, 2009

(54) OPTICAL PICKUP APPARATUS AND OPTICAL DISC APPARATUS

(75) Inventors: Masahiro Saito, Kanagawa (JP); Norio Fukasawa, Kanagawa (JP); Kiyoshi Toyota, Tokyo (JP); Junichi Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 717 days.

(21) Appl. No.: 11/154,575

(22) Filed: Jun. 17, 2005

(65) Prior Publication Data
US 2005/0281171 A1    Dec. 22, 2005

(30) Foreign Application Priority Data
Jun. 22, 2004    (JP) ............................. 2004-184134

(51) Int. Cl.
*G11B 7/00* (2006.01)
(52) U.S. Cl. ..................... 369/112.07; 369/112.12; 369/121
(58) Field of Classification Search ............. 369/112.07
See application file for complete search history.

(56) References Cited

U.S. PATENT DOCUMENTS

2002/0027844 A1 *   3/2002   Furuhata et al. .......... 369/44.37

FOREIGN PATENT DOCUMENTS

| JP | 2000-352621 | 12/2000 |
| JP | 2001-281432 | 10/2001 |
| JP | 2002-311219 | 10/2002 |
| JP | 2003-338076 | 11/2003 |

* cited by examiner

*Primary Examiner*—Paul Huber
(74) *Attorney, Agent, or Firm*—Oblon, Spivak, McClelland, Maier & Neustadt, L.L.P.

(57) ABSTRACT

An optical pickup apparatus and an optical disc apparatus are adapted to raise the efficiency of utilization of the lasers of the apparatus for accurately detecting tracking errors by raising the intensity ratio of the beam of the 0-th order to the beams of the ±1st orders produced by splitting of the laser beam of the wavelength to be subjected to division by three. The optical pickup apparatus includes a light emitting section for emitting a first laser beam having wavelength λ1 and a second laser beam having wavelength λ2 different from the wavelength λ1.

2 Claims, 11 Drawing Sheets

|  | DVD beam | CD beam |
|---|---|---|
| 0-th order | 85.96% | 98.01% |
| ±1st orders | 4.70% | 0.00% |
| ±2nd orders | 0.95% | 0.57% |
| ±3rd orders | 0.42% | 0.25% |
| ±4th orders | 0.29% | 0.00% |
| 0-th order/ 1st order | 18.29 | --- |

US 7,616,548 B2

OPTICAL PICKUP APPARATUS AND OPTICAL DISC APPARATUS

CROSS REFERENCES TO RELATED APPLICATIONS

The present invention contains subject matter related to Japanese Patent Application JP 2004-184134 filed in the Japanese Patent Office on Jun. 22, 2004, the entire contents of which being incorporated herein by reference.

BACKGROUND OF THE INVENTION

1. Field of the Invention

This invention relates to an optical pickup apparatus for recording information signals to and/or reproducing information signals from an optical disc. More particularly, it relates to an optical pickup apparatus and an optical disc apparatus adapted to emit laser beams of two different wavelengths corresponding to optical discs of a plurality of different types and detect tracking errors by a 3-beam method.

2. Description of the Related Art

Known optical pickup apparatus mounted in optical disc apparatus include 2-wavelength optical pickup apparatus that comprise a laser diode of the 660 nm band for replaying a DVD (digital versatile disc) and a laser diode of the 785 nm band for recording signals on or reproducing signals from a CD-R (compact disc-recordable).

In such 2-wavelength optical pickup apparatus, many optical elements are shared by the two laser beam optical systems thereof as shown in FIG. 1 for the purpose of down-sizing and weight-reduction.

Referring to FIG. 1, the illustrated 2-wavelength optical pickup apparatus 100 comprises a 2-wavelength semiconductor laser element 103, which 2-wavelength semiconductor laser element 103 by turn comprises a first semiconductor laser 103a adapted to emit a laser beam of the 660 nm band and a second semiconductor laser 103b adapted to emit a laser beam of the 785 nm band. A diffraction grating 102 is arranged on the optical paths of the laser beams emitted from the first and second semiconductor lasers 103a, 103b for splitting each of the laser beams into three beams. The optical pickup apparatus 100 operates for tracking control by arranging sub-beam respectively in front and at the back of the main beam for detecting information signals and detecting the sub-beams by means of a sub photo-detector.

Each of the laser beams emitted from the first and second semiconductor lasers 103a, 103b is split into three beams by the diffraction grating 102. Subsequently, the three beams are reflected by half mirror surface 104a of beam splitter 104 and collimated by a collimator lens 105 before they enter an objective lens 106.

The emitted beams are then converged onto the signal recording surface of optical disc 107 by the objective lens 106 and reflected by the signal recording surface to return, following the same optical paths. The returning beams pass through the objective lens 106 once again to be a collimated beam and the three beams are converged to the main photo-detector and the sub photo-detector of optical detector 108 by way of the collimator lens 105 and the beam splitter 104.

Thus, the 2-wavelength optical pickup apparatus 100 operates for focusing control and tracking control by means of a known astigmatic method or a differential push-pull method, detecting the returning beams converged to the optical detector 108.

Meanwhile, in the 2-wavelength optical pickup apparatus 100, two diffraction gratings 102 are arranged to diffract respectively the two beams of different wavelengths emitted from the first and second semiconductor lasers 103a, 103b in the three beams. However, when the two semiconductor lasers 103a, 103b are contained as a single package in the 2-wavelength optical pickup apparatus 100, the light emitting spots of the two semiconductor lasers 103a, 103b are located very close to each other and the two laser beams are guided to the optical disc 107 by way of a common optical path. As a result, the two laser beams inevitably pass through the two diffraction gratings to give rise to problems as listed below.

Firstly, each of the laser beams is subjected to a diffraction effect twice and hence unnecessary diffracted light is generated. Then, the intensity of the three beams that are required for detecting tracking errors is reduced to make it difficult to accurately detect tracking errors. A technique of making the length of the phase grading of each of the diffraction gratings equal to integer times of a wavelength that is not related to the division by three of the laser beam may be used to dissolve this problem. For example, the phase grating may be made to show a height that causes an optical path difference equal to $2\pi$, or the wavelength, to be produced when the laser beam of the wavelength of 660 nm is transmitted. With such an arrangement, the diffraction grating allows the laser beam of the wavelength of 660 nm that enters it to advance straight forward and diffracts only the laser beam of the wavelength of 785 nm.

At this time, the laser beam of the wavelength of 660 nm that is not subjected to the division by three is transmitted without being diffracted but the intensity ratio of diffracted light, or the ratio of the quantity of light of the 0-th order to that of the first order, is uniquely determined for the laser beam of the wavelength of 785 nm that is split into three beams. While the pitch of the diffraction grating has to be changed to adjust the intensity ratio of diffracted light, then there arises diffracted light of higher orders other than diffracted light of the 0-th order and that of the ±1st orders. As a result, it is not possible to raise the efficiency of diffracted light of the 0-th order that requires a high power level at the time of recording information signals, while suppressing generation of diffracted light of higher orders.

SUMMARY OF THE INVENTION

It is therefore desirable to provide a 2-wavelength optical pickup apparatus and an optical disc apparatus comprising two laser diodes for emitting laser beams of different wavelengths and adapted to raise the efficiency of utilization of the lasers of the apparatus for accurately detecting tracking errors by the intensity ratio of the beam of the 0-th order to the beams of the ±1st orders produced by splitting of the laser beam of the wavelength to be subjected to division by three and, at the same time, suppressing generation of diffracted light of higher orders other than the 0-th order and the ±1st orders.

According to the invention, there is provided an optical pickup apparatus and an optical disc apparatus comprising: a light emitting section for emitting a first laser beam having wavelength λ1 and a second laser beam having wavelength λ2 different from the wavelength λ1; a surface relief type first diffraction grating having a phase height of two steps produced by being equipped with a first phase grating and a second phase grating arranged at opposite sides of the first phase grating and adapted to split the laser beam of the wavelength λ1 into three beams and transmit substantially all of the laser beam of the wavelength λ2; a surface relief type second diffraction grating having a phase height of two steps produced by being equipped with a first phase grating and a second phase grating arranged at opposite sides of the first phase grating and adapted to split the laser beam of the wavelength λ2 into three beams and transmit substantially all of the laser beam of the wavelength λ1; an objective lens for converging the laser beams emitted from the light emitting section onto an optical disc; an optical element for branching the optical paths of return light reflected by the optical disc; and a light receiving section for receiving the return light branched by the optical element.

The laser beam emitted from an optical pickup apparatus or an optical disc apparatus according to the invention and having the above described configuration does not produce any light of the ±1st orders and hence can raise the intensity ratio of diffracted light of the 0-th order to that of the 1st order of the laser beam of the wavelength to be subjected to division by three when detecting tracking error signals by means of three beams. Additionally, they do not practically generate any diffracted light of higher orders and hence it is possible to raise the efficiency of utilization of the lasers of the apparatus and accurately detect tracking errors by means of three beams.

DETAILED DESCRIPTION OF THE PREFERRED EMBODIMENTS

Now, the present invention will be described in greater detail by referring to the accompanying drawings that illustrate preferred embodiments of optical pickup apparatus 1 according to the invention and adapted to be mounted in an optical disc apparatus.

Figure 1:
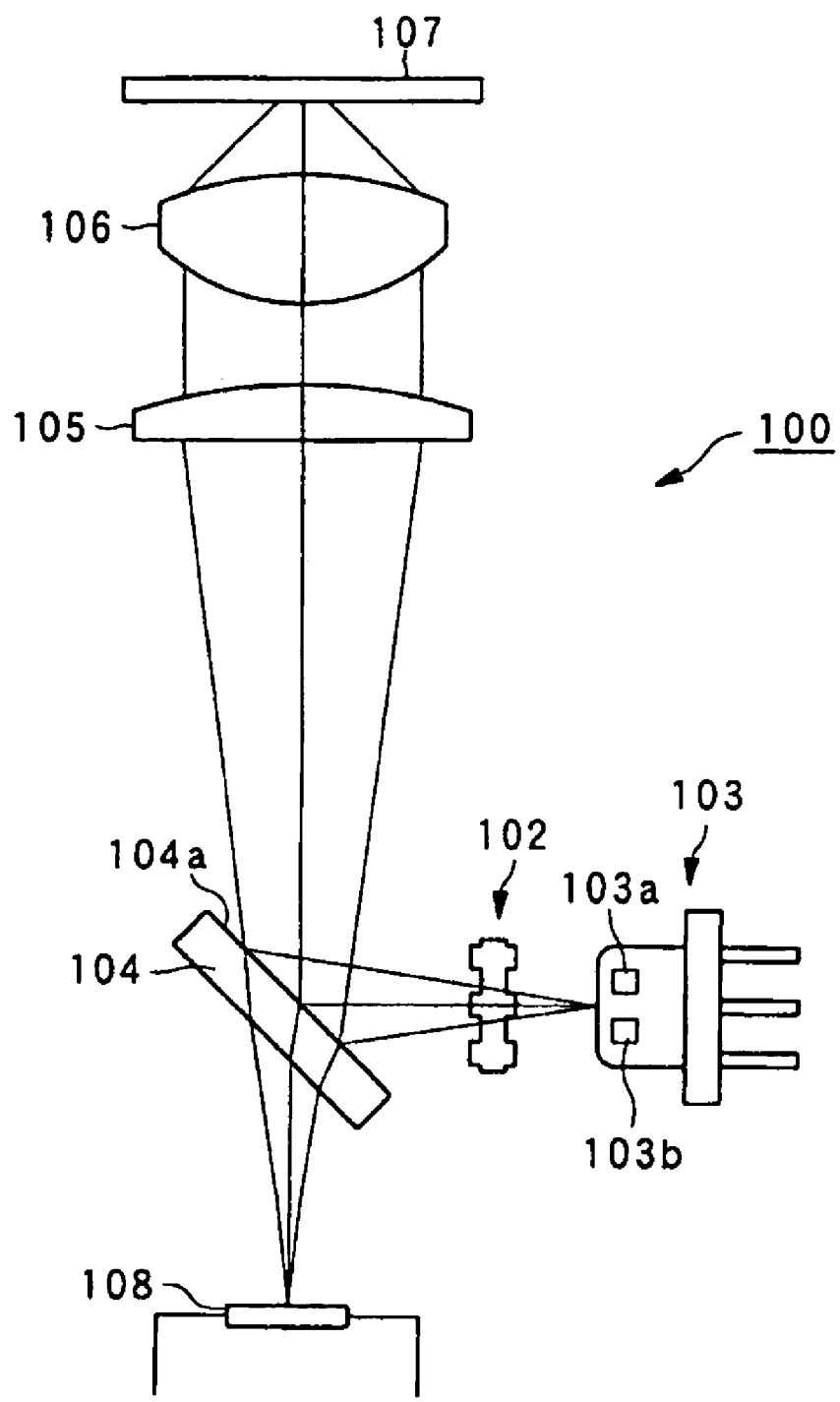
FIG. 1 is a schematic illustration of a known 2-wavelength optical pickup apparatus, showing the configuration thereof.
Figure 2:
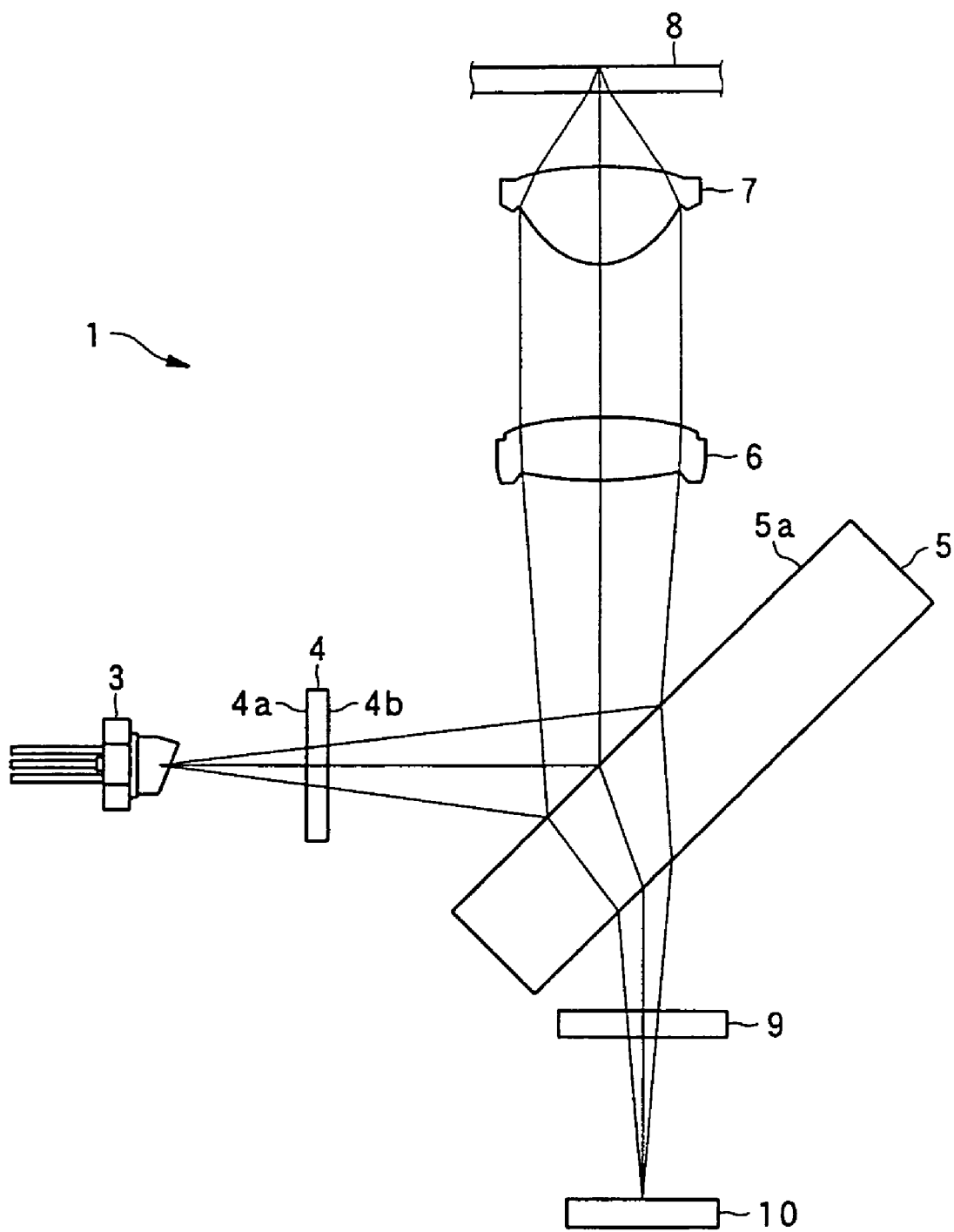
FIG. 2 is a schematic illustration of an embodiment of optical pickup apparatus according to the invention, showing the configuration thereof.

The optical pickup apparatus 1 of this embodiment contains a laser diode of the 660 nm band for replaying a DVD and a laser diode of the 785 nm band for recording signals on or reproducing signals from a CD or a CD-R as a single package. FIG. 2 is a schematic illustration of the embodiment of optical pickup apparatus 1, showing the configuration thereof. Referring to FIG. 2, the optical pickup apparatus 1 comprises a 2-wavelength semiconductor laser element 3, which includes a laser diode of the 660 nm band and a laser diode of the 785 nm band, a composite optical element 4 having a diffraction grating for transmitting the laser beams emitted from the 2-wavelength semiconductor laser element 3 or splitting them into three beams, a beam splitter 5 for reflecting or transmitting the laser beams split by the composite optical element 4 or reflected by optical disc 8, a collimator lens 6, an objective lens 7 for the two wavelengths, a plate-shaped optical element 9 on which a diffraction grating for aligning the laser beam of the 660 nm band and the laser beam of the 785 nm band reflected from the optical disc 8 is formed and a photo-detector 10 for detecting signals that operates as common light receiving element for receiving the laser beam of the 660 nm band and the laser beam of the 785 nm band.

The 2-wavelength semiconductor laser element 3 has a CD light emitting section for emitting a laser beam of the 785 nm band for a CD and a DVD light emitting section for emitting a laser beam of the 660 nm band for a DVD. The CD light emitting section and the DVD light emitting section are separated from each other by 100 to 300 μm and arranged so as to be able to emit respective laser beams in the same direction.

The composite optical element 4 is arranged between the 2-wavelength semiconductor laser element 3 and the beam splitter 5. It is a surface relief type diffraction grating that includes first and second diffraction gratings 4a, 4b arranged respectively at the side of the 2-wavelength semiconductor laser element 3 and at the side of the beam splitter 5 and adapted to split the respective laser beams emitted from the 2-wavelength semiconductor laser element 3 into three beams. The first diffraction grating 4a of the composite optical element 4 arranged at the side of the 2-wavelength semiconductor laser element 3 diffracts the laser beam of the 785 nm band for CDs to produce three beams and transmits the laser beam of the 660 nm band for DVDs, while the second diffraction grating 4b of the composite optical element 4 arranged at the side of the beam splitter 5 diffracts the laser beam of the 660 nm band for DVDs to produce three beams and transmits the laser beam of the 785 nm band for CDs.

More specifically, as the laser beam of the 785 nm band that is emitted from the CD light emitting section of the 2-wavelength semiconductor laser element 3 enters the composite optical element 4, it is diffracted by the first diffraction grating 4a to produce three beams including a beam of the 0-th order (also to be referred to as main beam hereinafter) and two beams of the ±1st orders (also to be referred to as sub beams hereinafter), which are then substantially transmitted through the second diffraction grating 4b and emitted toward the beam splitter 5. Similarly, as the laser beam of the 660 nm band that is emitted from the DVD light emitting section of the 2-wavelength semiconductor laser element 3 enters the composite optical element 4, it is substantially transmitted through the first diffraction grating 4a and diffracted by the second diffraction grating 4b to produce three beams including a main beam and two sub beams, which are then emitted toward the beam splitter 5.

Figure 3:
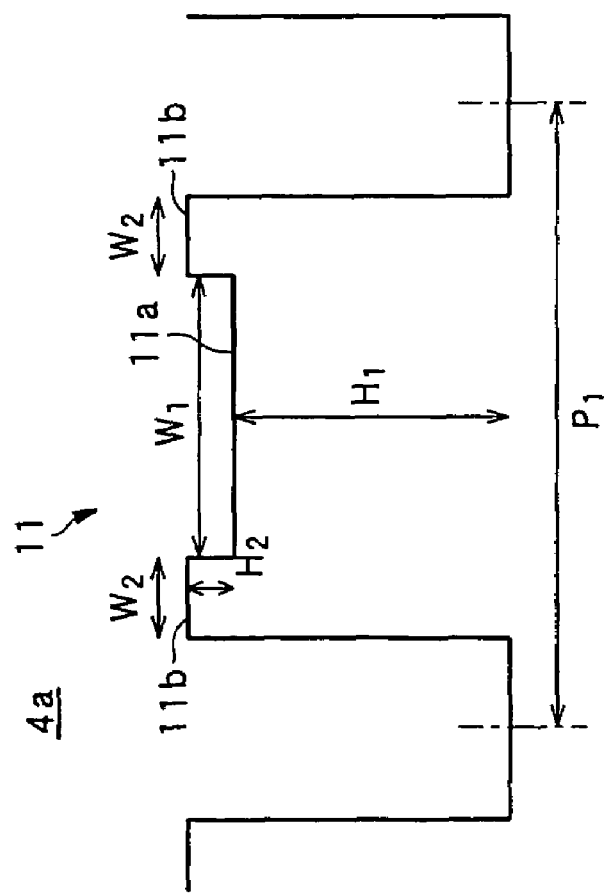
FIG. 3 is a schematic lateral view of the first diffraction grating of a composite optical element.

The first diffraction grating 4a is realized by repetitively forming a micro grating pattern as shown in FIG. 3. Each of the gratings 11 shows a substantially stepped cross section and includes a first phase grating 11a having a width of W1 and a second phase grating 11b formed at opposite sides of the first phase grating 11a like two oppositely disposed steps, each step having a width of W2. The first and second phase gratings 11a, 11b satisfy a relationship of 0.61×P1<(W1+2×W2)<0.85×P1, where P1 is the grating pitch of the grating 11. If the wavelength of the laser beam of the 660 nm band for DVDs is λd and the refractive index of the phase grating 11a when the laser beam of the wavelength λd enters it is Nd, the phase height H1 of the first phase grating 11a is not smaller than 0.89 times and not greater than 1.13 times of λd/(Nd−1) and the phase height H2 of the second phase grating 11b is not smaller than 0.72 times and not greater than 1.31 times of λd/(Nd−1).

If, for example, the pitch P1 of the grating pattern of the first diffraction grating 4a is 1.0, the width W1 and the phase height H1 of the first phase grating 11a are respectively 0.395 and 1.02×λd/(Nd−1). Similarly, if the pitch P1 of the grating pattern of the first diffraction grating 4a is 1.0, the width W2 and the phase height H2 of the second phase grating 11b are respectively 0.18 and 1.05×λd/(Nd−1).

The first diffraction grating 4a including the first and second phase gratings 11a, 11b substantially transmits the laser beam of the 660 nm band for DVDs and diffracts the laser beam of the 785 nm band for CDs to produce a main beam and two sub beams. In other words, the first diffraction grating 4a shows the highest diffraction efficiency for the beam of the 0-th order, which is equal to 98.08%, with regard to the incident laser beam of the wavelength of 660 nm. It shows a diffraction efficiency of the beam of the 0-th order (main beam) of 86.71% and that of the beams of the ±1st orders (sub beams) of 4.69% for the incident laser beam of the wavelength of 785 nm. The ratio of the intensity of the diffracted main beam (beam of the 0-th order) to that of the diffracted sub beams (beams of the ±1st order), or the beam of the 0-th order/the beams of the ±1st orders, is equal to 18.48.

Thus, when the laser beam of the 785 nm band for CDs is diffracted by the first diffraction grating 4a to produce three beams, the diffraction grating 4a shows a high diffraction efficiency for the beam of the 0-th order and ensures a diffraction efficiency of 96% for the beam of the 0-th order and the beams of the ±1st orders as put together. In other words, it suppresses the generation of any diffracted beams of higher orders other than the beam of the 0-th order and the beams of the ±1st orders. The first diffraction grating 4a can transmit almost all the laser beam of the 660 nm band for DVDs, or 98%, and suppress the generation of any diffracted beams of higher orders including the ±1st orders.

Figure 4:
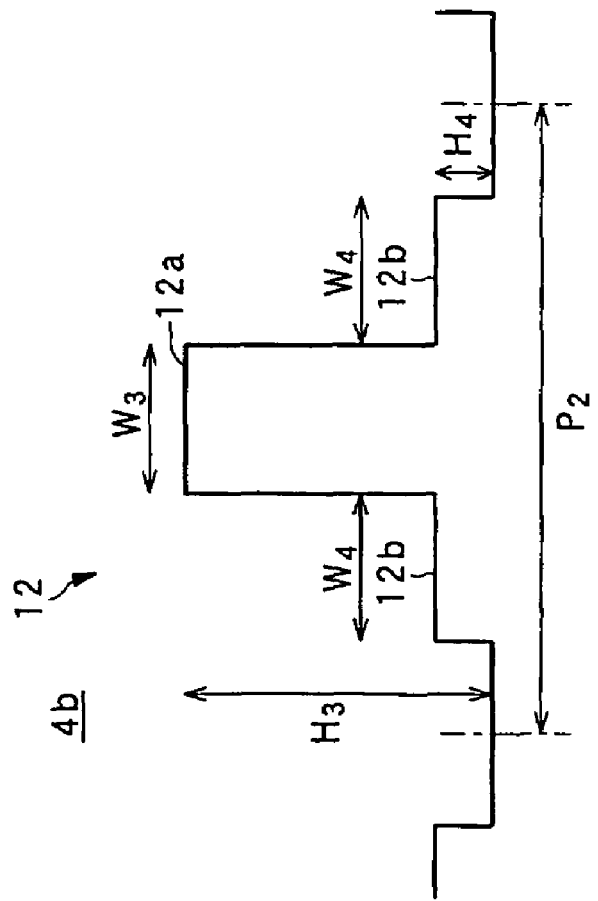
FIG. 4 is a schematic lateral view of the second diffraction grating of the composite optical element.

The second diffraction grating 4b is realized by repetitively forming a micro grating pattern as shown in FIG. 4. Each of the gratings 12 shows a substantially stepped cross section and includes a first phase grating 12a having a width of W3 and a second phase grating 12b formed at opposite sides of the first phase grating 12a like two oppositely disposed steps, each step having a width of W4. The width W3 of the first phase grating 12a is not smaller than 11% and not greater than 33% of the pitch P2 of the grating pattern. If the wavelength of the laser beam of the 785 nm band for CDs is λc and the refractive index when the laser beam of the wavelength λc enters is Nc, the phase height H3 of the first phase grating 12a is not smaller than 0.94 times and not greater than 1.1 times of λc/(Nc−1). The width W4 of the second phase grating 12b arranged at opposite sides of the first phase grating 12a like two oppositely disposed steps is not greater than 37% of the pitch P2 of the grating pattern and the phase height H4 of the second phase grating 12b is not greater than 0.22 times of λc/(Nc−1).

If, for example, the pitch P2 of the grating pattern of the second diffraction grating 4b is 1.0, the width W3 and the phase height H3 of the first phase grating 12a are respectively 0.20 and 0.98×λc/(Nc−1). Similarly, if the pitch P2 of the grating pattern of the second diffraction grating 4b is 1.0, the width W4 and the phase height H4 of the second phase grating 12b are respectively 0.20 and 0.03×λc/(Nc−1).

The second diffraction grating 4b including the first and second phase gratings 12a, 12b substantially transmits the laser beam of the 785 nm band for CDs and diffracts the laser beam of the 660 nm band for DVDs to produce a main beam and two sub beams. In other words, the second diffraction grating 4b shows the highest diffraction efficiency for the beam of the 0-th order, which is equal to 98.01%, with regard to the incident laser beam of the wavelength of 785 nm. It shows a diffraction efficiency of the beam of the 0-th order (main beam) of 85.96% and that of the beams of the ±1st orders (sub beams) of 4.70% for the incident laser beam of the wavelength of 660 nm. The ratio of the intensity of the diffracted main beam (beam of the 0-th order) to that of the diffracted sub beams (beams of the ±1st order), or the beam of the 0-th order/the beams of the ±1st orders, is equal to 18.29.

Thus, when the laser beam of the 660 nm band for DVDs is diffracted by the second diffraction grating 4b to produce three beams, the diffraction grating 4b shows a high diffraction efficiency for the beam of the 0-th order and ensures a diffraction efficiency of 95% for the beam of the 0-th order and the beams of the ±1st orders put together. In other words, it suppresses the generation of any diffracted beams of higher orders other than the beam of the 0-th order and the beams of the ±1st orders. The second diffraction grating 4b can transmit almost all the laser beam of the 785 nm for CDs, or 98%, and suppress the generation of any diffracted beams of higher orders including the ±1st orders.

With a composite optical element 4 having the above described configuration, the laser beam having a wavelength that is transmitted through the first diffraction grating 4a or the second diffraction grating 4b does not practically give rise to beams of the ±1st orders when tracking errors are detected by means of three beams to make it possible to raise the ratio of the intensity of the diffracted beam of the 0-th order to that of the diffracted beams of the ±1st order. Additionally, diffracted beams of higher order are practically not generated at all to consequently raise the efficiency of utilization of laser beams of the optical pickup apparatus 1 so that it is possible to accurately detect tracking error signals by means of three beams.

Figure 5:
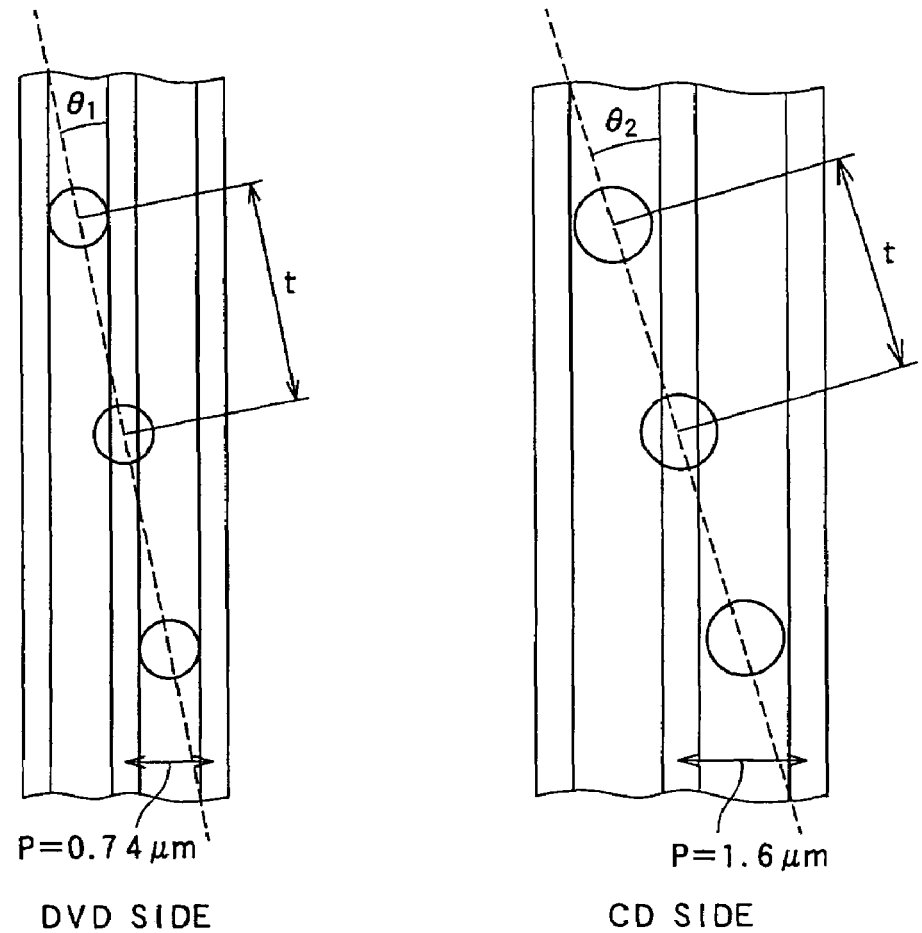
FIG. 5 is a schematic plan view of laser spots formed by the laser beams irradiated onto the signal recording surface of an optical disc.

A differential push-pull (DPP) technique using three beams is employed for detecting tracking error signals by means of the composite optical element 4. As shown in FIG. 5, the composite optical element 4 converges the main spot of the main beam on a tack of the signal recording surface of the optical disc 8 in such a way that the two sub spots of the converged sub beams are radially displaced from the main spot at the radially opposite sides thereof by a half of the track pitch. Then, the push-pull signal for the main spot and the oppositely disposed sub spots is detected by the photo-detector 10, which will be described in greater detail hereinafter, and the offset that is produced by the radial inclination, if any, of the optical disc 8 and the shift of the objective lens 7 is compensated by determining the differential of the push-pull signal.

The photo-detector 10 is a light receiving element for receiving the laser beam of the 660 nm band and the laser beam of the 785 nm band. As will be described in greater detail hereinafter, it has a first light receiving surface 15 to be irradiated by the main beam and second and third light receiving surfaces 16, 17 to be irradiated respectively by the sub beams, the second and third light receiving surfaces 16, 17 being arranged oppositely with the first light receiving surface 15 interposed between them (see FIG. 6).

For the photo-detector 10 having the above described configuration to be able to detect a differential push-pull signal, the direction of arrangement of the first and second phase gratings 11a, 11b of the first diffraction grating 4a and that of the first and second phase gratings 12a, 12b of the second diffraction grating 4b are separated from each other by a predetermined angle. More specifically, for a 2-wavelength optical pickup apparatus 1 containing a laser diode of the 660 nm band and a laser diode of the 785 nm band as a single package, it is necessary that each of the light receiving surfaces of the photo-detector 10, which is a common light receiving element for receiving a laser beam of the 660 nm band and a laser beam of the 785 nm band, receives either a main beam or a sub beam of either of the two wavelengths. Therefore, the gap (t) separating the main spot and the sub spots of the laser beam of one of the two wavelengths needs to be equal to the gap (t) separating the main spot and the sub spots of the laser beam of the other wavelength.

Meanwhile, the track pitch p of the DVD is 0.74 μm whereas the track pitch p of the CD is 1.6 μm. In other words, the track pitch varies depending on the type of the optical disc 8. Therefore, for the light receiving surfaces of the photo-detector 10, which is a common light receiving element, to respectively receive the main spot and the sub spots of the laser beam of the wavelength of 660 nm and those of the laser beam of the wavelength of 785 nm at the centers thereof, it is necessary that the angles θ1 and θ2 of the first and second diffraction gratings 4a, 4b relative to the respective tracks have to be shifted in such a way that the array of the optical spots shows a DPP arrangement on the recording tracks of the optical disc 8 and hence the beam of the 0-th order is irradiated onto a pit section whereas the beams of the ±1st orders are irradiated respectively onto land sections.

If, for example, the gap (t) separating the main spot and the sub spots is 25 μm both for the laser beam of the wavelength of 660 nm and for the laser beam of the wavelength of 785 nm, the inclination of the array of the optical spots of the laser beam relative to the track of the DVD has to be differentiated by about 1 degree from the inclination of the array of the optical spots of the laser beam relative to the track of the CD because of the difference of track pitch between the DVD and the CD. Therefore, it is necessary to design that the grating 11 of the first diffraction grating 4a and the grating 12 of the second diffraction grating 4b are inclined to show an angle of about 1 degree.

Then, the relative angle of the angle θ1 relative to the track of the phase gratings 11a, 11b of the first diffraction grating 4a and the angle θ2 relative to the track of the phase gratings 12a, 12b of the second diffraction grating 4b is defined to be 1 degree and the grating pitch P1 of the first diffraction grating 4a is defined in such a way that the gap (t) separating the main spot and the sub spots of the laser beam of the 785 nm band for the CD is equal to 25 μm, whereas the grating pitch P2 of the second diffraction grating 4b is defined in such a way that the gap (t) separating the main spot and the sub spots of the laser beam of the 660 nm band for the DVD is also equal to 25 μm. With this arrangement, the light receiving surfaces of the photo-detector 10 can respectively receive the main spot and the sub spots of the laser beam of the 660 nm band and those of the laser beam of the 785 nm.

Each of the laser beam split into three and emitted from the composite optical element 3 is then irradiated onto the signal recording surface of the optical disc 8 by way of the beam splitter 5, the collimator lens 6 and the common objective lens 7 for the two wavelengths and the laser beam reflected by the signal recording surface is detected by the photo-detector 10 by way of the plate-shaped optical element 9.

The beam splitter 5 reflects the laser beam that has been split into three by the composite optical element 4 toward the optical disc 8 by a half mirror 5a. Additionally, the beam splitter 5 transmits the returning laser beam reflected by the optical disc 8 so as to make it strike the plate-shaped optical element 9.

The collimator lens 6 collimates the laser beam reflected by the beam splitter 5 to a collimated beam. The common objective lens 7 for the two wavelengths converges the laser beams of the two wavelengths of 660 nm and 785 nm, each of which has been split into three, respectively onto the signal recording surface of the DVD and the signal recording surface of the CD.

The plate-shaped optical element 9 comprises a diffraction grating that causes the returning laser beams of the wavelengths of 660 nm and 785 nm that have been reflected by the optical disc 8 and transmitted through the beam splitter 5 to enter the light receiving surfaces of the photo-detector 10. The plate-shaped optical element 9 is adapted to diffract the laser beams of 660 nm and 785 nm that have been reflected by the optical disc 8 in such a way that their optical axes are aligned with the respective light receiving surfaces of the photo-detector 10.

Figure 6:
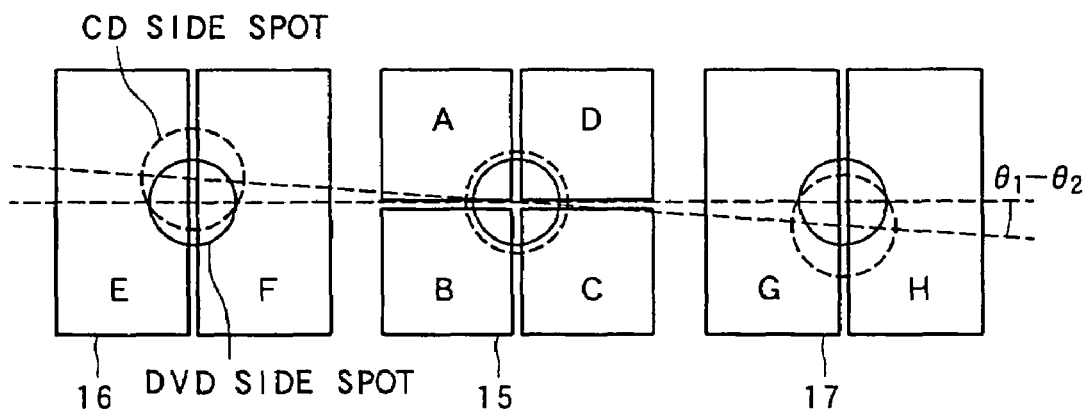
FIG. 6 is a schematic plan view of photo-detectors onto each of which laser beams of two different wavelengths are irradiated to form respective spots.

The photo-detector 10 is a common light receiving element for the returning laser beams of 660 nm and 785 nm as shown in FIG. 6 that is adapted to receive the laser beams of the two different wavelengths in such a way that their optical axes are aligned with the respective light receiving surfaces of the photo-detector 10. It has a first light receiving surface 15 for receiving the main beams of the two wavelengths and second and third light receiving surfaces 16, 17 arranged opposite to each other with the first light receiving surface 15 interposed between them and adapted to receive the sub beams of the two wavelengths. The first light receiving surface 15 is divided into four light receiving sections A, B, C, D and adapted to detect focus error signals for generating RF signals and focusing servo signals for the purpose of generating digital signals. The second light receiving surface 16 is divided into two light receiving sections E, F and the third light receiving surface 17 is divided into two light receiving sections G, H. They are adapted to detect tracking error signals for the purpose of generating tracking servo signals.

The photo-detector 10 is arranged in such a way that it produces predetermined angles respectively with the gratings 11, 12 of the first and second diffraction gratings of the above described composite optical element 4 and the grating pitch is so selected as to produce a same gap (t) separating the main beam and the sub beams for the laser beams of the two wavelengths. With this arrangement, the photo-detector 10 operates as a common light receiving element whose light receiving surfaces receive both the laser beam of the 660 nm band and the laser beam of the 785 nm band.

If the outputs of the light receiving sections A through H of the first through third light receiving surfaces 15 through 17 are SA, SB, SC, SD, SE, SF, SG and SH respectively, the photo-detector 10 having the above described configuration can detect a tracking error signal TE when the relationship of TE=((SA+SB)−(SC+SD))−k((SE−SF)+(SG−SH)) holds true, where k is selected so as to eliminate any offset of the tracking error signal.

Now, the operation of the optical pickup apparatus 1 will be described below. When, for example, a DVD is loaded as optical disc, the optical pickup apparatus 1 emits a laser beam of the wavelength of the 660 nm band from the 2-wavelength semiconductor laser 3. The laser beam of the wavelength of 660 nm enters the first diffraction grating 4a arranged at the side of the 2-wavelength semiconductor laser element 3 of the composite optical element 2. Since the diffraction efficiency of the first diffraction grating 4a is set to be highest for the 0-th order relative to a laser beam of the wavelength of 660 nm, the incident light of the wavelength of 660 nm is transmitted by substantially 100% without being attenuated to enter the second diffraction grating 4b. On the other hand, the second diffraction grating 4b diffracts the laser beam of the wavelength of 660 nm to produce three beams of the 0-th order and the ±1st orders. At this time, the second diffraction grating 4b ensures a diffraction efficiency of 95% for the beam of the 0-th order and the beams of the ±1st orders as put together and suppresses the generation of any diffracted beams of higher orders other than those beam.

When, on the other hand, a CD or a CD-R is loaded as optical disc 8, the optical pickup apparatus 1 emits a laser beam of the wavelength of the 785 nm band from the 2-wavelength semiconductor laser 3. The laser beam of the wavelength of 785 nm strikes the composite optical element 4, it firstly enters the first diffraction grating 4a arranged at the side of the 2-wavelength semiconductor laser element 3 of the composite optical element 4. The first diffraction grating 4a diffracts the laser beam of the wavelength of 758 nm to produce three beams of the 0-th order and the ±1st orders, which then enter the second diffraction grating 4b. At this time, the first diffraction grating 4a ensures a diffraction efficiency of 96% for the beam of the 0-th order and the beams of the ±1st orders as put together and suppresses the generation of any diffracted beams of higher orders other than those beam. On the other hand, since the diffraction efficiency of the second diffraction grating 4b is set to be highest for the 0-th order relative to a laser beam of the wavelength of 785 nm, the incident light of the wavelength of 785 nm is transmitted by substantially 100% without being attenuated.

As the laser beam emitted from the composite optical element 4 irradiates the half mirror plane 5a of the beam splitter 5, it is raised to the side of the optical disc 8 and collimated by the collimator lens 6. Then, the laser beam is converged onto the signal recording surface of the optical disc 8 by the objective lens 7 to produce optical spots there including an optical spot of a main beam and two optical spots of sub beams.

The spot of the main beam, or the main spot, of the 0-th order is formed on a track, whereas the spots of the sub beams, or the sub spots, of the ±1st orders are formed at respective positions that are radially shifted by a half of the track pitch. The gap (t) separating the main spot and the sub spots is set to be equal to a constant value regardless if the laser beam has a wavelength of 660 nm or a wavelength of 785 nm and also equal to the gap separating the first light receiving surface 15 and the second and third light receiving surfaces 16, 17 of the photo-detector 10. Since the spot gap (5) is set to a constant value regardless of the difference of track pitch, the relative angles of the first and second diffraction gratings 4a, 4b relative to the track are shifted and hence the array of the laser beam spots of the wavelength of 660 nm and that of the laser beam spots of the wavelength of 785 nm are inclined by the relative angles of the grating 11 and the grating 12.

The laser beams reflected by the optical disc 8 are transmitted through the beam splitter 5 and enters the plate-shaped optical element 9. Then, the laser beams are diffracted in such a way that the main beam is converged onto the first light receiving surface 15, while the sub beams are converged respectively onto the second and third light receiving surfaces 16, 17. At this time, the plate-shaped optical element 9 diffracts them in such a way the optical axis of the laser beam of the wavelength of 660 nm agrees with the optical axis of the laser beam of the wavelength of 785 nm.

As a result, of the returning laser beams, regardless if the wavelength is 660 nm or 785 nm, the main beam is irradiated onto the first light receiving surface 15 of the photo-detector 10, whereas the sub beams are irradiated respectively onto the second and third light receiving surfaces 16, 17 of the photo-detector 10. Since the phase gratings 11a, 11b of the first diffraction grating 4a and the phase gratings 12a, 12b of the second diffraction grating 4b are inclined, the array of the laser beam spots converged to the photo-detector 10 are also inclined by the same respective angles.

The optical pickup apparatus 1 detects the RF signal for recording or reproducing an information signal and a tracking error signal for tracking control by detecting the spots of light irradiated onto the first through third light receiving surfaces 15 through 17 of the photo-detector 10. Since the first diffraction grating 4a of the optical pickup apparatus 1 is designed to show the highest diffraction efficiency for the laser beam of the 0-th order at 660 nm and ensures a diffraction efficiency of 96% for the beam of the 0-th order and the beams of the ±1st orders as put together at 785 nm while the second diffraction grating 4b of the optical pickup apparatus 1 is designed to show the highest diffraction efficiency for the laser beam of the 0-th order at 785 nm and ensures a diffraction efficiency of 95% for the beam of the 0-th order and the beams of the ±1st orders as put together at 660 nm, it is possible to maintain the quantity of light of the 0-th order to show a high power level required for recording an information signal and accurately detect a tracking error signal by means of the three beams.

In an optical pickup apparatus according to the invention, the composite optical element may be embodied in a manner as described below. In the following description, the components of the optical pickup apparatus 1 that are same as those described above are denoted respectively by the same reference symbols and will not be described any further.

The composite optical element 20 is arranged between the 2-wavelength semiconductor laser element 3 and the beam splitter 5. It is a surface relief type diffraction grating that includes first and second diffraction gratings 20a, 20b arranged respectively at the side of the 2-wavelength semiconductor laser element 3 and at the side of the beam splitter 5 and adapted to split the respective laser beams emitted from the 2-wavelength semiconductor laser element 3 into three beams. The first diffraction grating 20a of the composite optical element 20 arranged at the side of the 2-wavelength semiconductor laser element 3 diffracts the laser beam of the 785 nm band for CDs to produce three beams of the 0-th order and the ±1st orders and transmits substantially all the laser beam of the 660 nm band for DVDs, while the second diffraction grating 20b of the composite optical element 20 arranged at the side of the beam splitter 5 diffracts the laser beam of the 660 nm band for DVDs to produce three beams of the 0-th order and the ±1st orders and transmits substantially all the laser beam of the 785 nm band for CDs.

Figure 7:
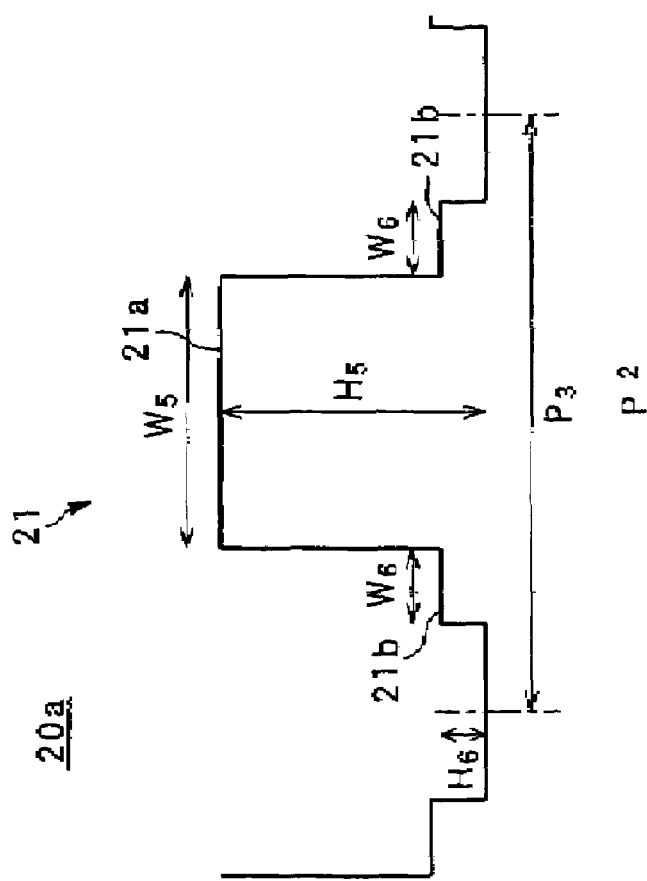
FIG. 7 is a schematic lateral view of the first diffraction grating of another embodiment of composite optical element.

The first diffraction grating 20a is realized by repetitively forming a micro grating pattern as shown in FIG. 7. Each of the gratings 21 shows a substantially stepped cross section and includes a first phase grating 21a having a width of W5 and a second phase grating 21b formed at opposite sides of the first phase grating 21a like two oppositely disposed steps, each step having a width of W6. The width W5 of the first phase grating 21a is defined to be not smaller than 62% and not greater than 75% of the pitch P3 of the grating pattern. If the wavelength of the laser beam of the 660 nm band for DVDs is $\lambda d$ and the refractive index of the first phase grating 21a when the laser beam of the wavelength $\lambda d$ enters it is Nd, the phase height H5 of the first phase grating 21a is not smaller than 1.01 times and not greater than 1.24 times of λd/(Nd−1). On the other hand, the width W6 of the second phase grating 21b arranged at opposite sides of the first phase grating 21a like two oppositely disposed steps is defined to be not greater than 19% of the pitch P3 of the grating pattern. The phase height H6 of the second phase grating 21b is not smaller than 0.34 times of λd/(Nd−1).

If, for example, the pitch P3 of the grating pattern of the first diffraction grating 20a is 1.0, the width W5 and the phase height H5 of the first phase grating 21a are respectively 0.69 and 1.05×λd/(Nd−1). Similarly, if the pitch P3 of the grating pattern of the first diffraction grating 20a is 1.0, the width W6 and the phase height H6 of the second phase grating 21b are respectively 0.12 and 0.03×λd/(Nd−1).

The first diffraction grating 20a including the first and second phase gratings 21a, 21b substantially transmits the laser beam of the 660 nm band for DVDs and diffracts the laser beam of the 785 nm band for CDs to produce a main beam and two sub beams. In other words, the first diffraction grating 20a shows the highest diffraction efficiency for the beam of the 0-th order, which is equal to 99.19%, with regard to the incident laser beam of the wavelength of 660 nm. It shows a diffraction efficiency of the beam of the 0-th order (main beam) of 83.99% and that of the beams of the ±1st orders (sub beams) of 5.07% for the incident laser beam of the wavelength of 785 nm. The ratio of the intensity of the diffracted main beam (beam of the 0-th order) to that of the diffracted sub beams (beams of the ±1st order), or the beam of the 0-th order/the beams of the ±1st orders, is equal to 16.56.

Thus, when the laser beam of the 785 nm band for CDs is diffracted by the first diffraction grating 20a to produce three beams, the diffraction grating 20a shows a high diffraction efficiency for the beam of the 0-th order and ensures a diffraction efficiency of 94% for the beam of the 0-th order and the beams of the ±1st orders as put together. In other words, it suppresses the generation of any diffracted beams of higher orders other than the beam of the 0-th order and the beams of the ±1st orders. The first diffraction grating 20a can transmit almost all the laser beam of the 660 nm band for DVDs, or 99%, and suppress the generation of any diffracted beams of higher orders including the ±1st orders for about 0.2%.

Figure 8:
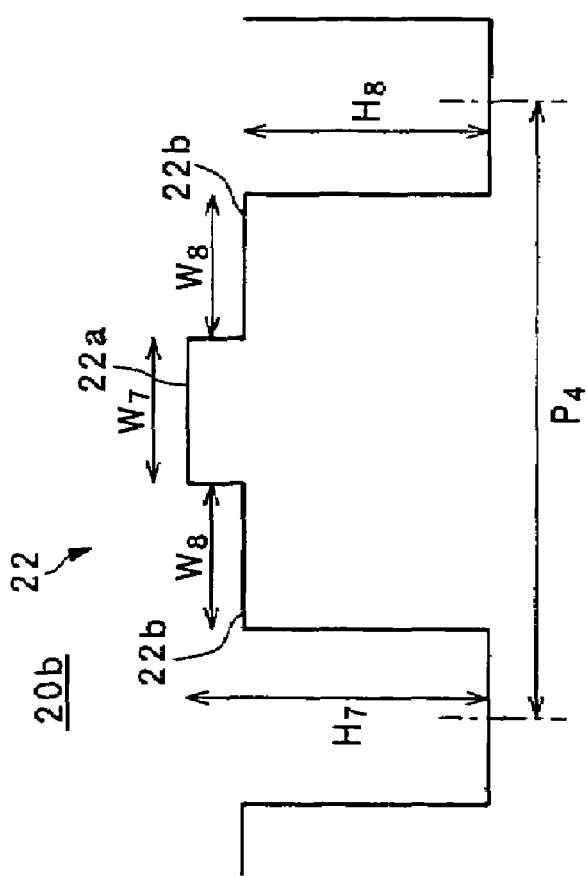
FIG. 8 is a schematic lateral view of the second diffraction grating of the embodiment of composite optical element of FIG. 7.

The second diffraction grating 20b is realized by repetitively forming a micro grating pattern as shown in FIG. 8. Each of the gratings 22 shows a substantially stepped cross section and includes a first phase grating 22a having a width of W7 and a second phase grating 22b formed at opposite sides of the first phase grating 22a like two oppositely disposed steps, each step having a width of W8. The first and second phase gratings 22a, 22b satisfy a relationship of 0.67× P4<(W7+2×W8)<0.89×P4, where P4 is the grating pitch of the grating 22. If the wavelength of the laser beam of the 785 nm band for CDs is λc and the refractive index of the first phase grating 22a when the laser beam of the wavelength λc enters it is Nc, the phase height H7 of the first phase grating 22a is not smaller than 0.93 times and not greater than 1.06 times of λc/(Nc−1) and the phase height H8 of the second phase grating 22b is not smaller than 0.74 times and not greater than 1.06 times of λc/(Nc−1).

If, for example, the pitch P4 of the grating pattern of the second diffraction grating 20b is 1.0, the width W7 and the phase height H7 of the first phase grating 22a are respectively 0.40 and 0.98×λc/(Nc−1). Similarly, if the pitch P4 of the grating pattern of the second diffraction grating 20b is 1.0, the width W8 and the phase height H8 of the second phase grating 22b are respectively 0.20 and 0.94×λc/(Nc−1).

The second diffraction grating 20b including the first and second phase gratings 22a, 22b substantially transmits the laser beam of the 785 nm band for CDs and diffracts the laser beam of the 660 nm band for DVDs to produce a main beam and two sub beams. In other words, the second diffraction grating 20b shows the highest diffraction efficiency for the beam of the 0-th order, which is equal to 98.01%, with regard to the incident laser beam of the wavelength of 785 nm. It shows a diffraction efficiency of the beam of the 0-th order (main beam) of 85.96% and that of the beams of the ±1st orders (sub beams) of 4.70% for the incident laser beam of the wavelength of 660 nm. The ratio of the intensity of the diffracted main beam (beam of the 0-th order) to that of the diffracted sub beams (beams of the ±1st order), or the beam of the 0-th order/the beams of the ±1st orders, is equal to 18.29.

Thus, when the laser beam of the 660 nm band for DVDs is diffracted by the second diffraction grating 20b to produce three beams, the diffraction grating 20b shows a high diffraction efficiency for the beam of the 0-th order and ensures a diffraction efficiency of 95% for the beam of the 0-th order and the beams of the ±1st orders put together. In other words, it suppresses the generation of any diffracted beams of higher orders other than the beam of the 0-th order and the beams of the ±1st orders. The second diffraction grating 20b can transmit almost all the laser beam of the 785 nm band for CDs of the 0-th order, or 98%, and suppress the generation of any diffracted beams of higher orders including the ±1st orders.

In an optical pickup apparatus according to the invention, the composite optical element may be embodied in a manner as described below. In the following description, the components of the optical pickup apparatus 1 that are same as those described above are denoted respectively by the same reference symbols and will not be described any further.

The composite optical element 30 is arranged between the 2-wavelength semiconductor laser element 3 and the beam splitter 5. It is a surface relief type diffraction grating that includes first and second diffraction gratings 30a, 30b arranged respectively at the side of the 2-wavelength semiconductor laser element 3 and at the side of the beam splitter 5 and adapted to split the respective laser beams emitted from the 2-wavelength semiconductor laser element 3 into three beams. The first diffraction grating 30a of the composite optical element 30 arranged at the side of the 2-wavelength semiconductor laser element 3 diffracts the laser beam of the 785 nm band for CDs to produce three beams of the 0-th order and the ±1st orders and transmits substantially all the laser beam of the 660 nm band for DVDs, while the second diffraction grating 30b of the composite optical element 30 arranged at the side of the beam splitter 5 diffracts the laser beam of the 660 nm band for DVDs to produce three beams of the 0-th order and the ±1st orders and transmits substantially all the laser beam of the 785 nm band for CDs.

Figure 9:
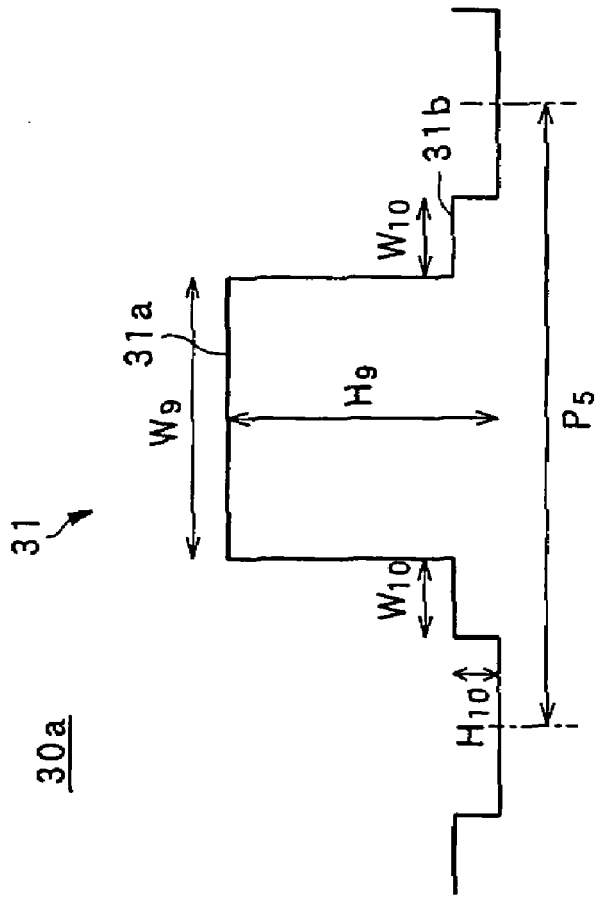
FIG. 9 is a schematic lateral view of the first diffraction grating of still another embodiment of composite optical element.

The first diffraction grating 30a is realized by repetitively forming a micro grating pattern as shown in FIG. 9. Each of the gratings 31 shows a substantially stepped cross section and includes a first phase grating 31a having a width of W9 and a second phase grating 31b formed at opposite sides of the first phase grating 31a like two oppositely disposed steps, each step having a width of W10. The width W9 of the first phase grating 31a is defined to be not smaller than 26% and not greater than 39% of the pitch P5 of the grating pattern. If the wavelength of the laser beam of the 660 nm band for DVDs is λd and the refractive index of the first phase grating 31a when the laser beam of the wavelength λd enters it is Nd, the phase height H9 of the first phase grating 31a is not smaller than 1.01 times and not greater than 1.19 times of λd/(Nd−1). On the other hand, the width W1 of the second phase grating 31b arranged at opposite sides of the first phase grating 31a like two oppositely disposed steps is defined to be not greater than 37% of the pitch P5 of the grating pattern. The phase height H10 of the second phase grating 31b is not greater than 0.31 times of λd/(Nd−1).

If, for example, the pitch P5 of the grating pattern of the first diffraction grating 30a is 1.0, the width W9 and the phase height H9 of the first phase grating 31a are respectively 0.27 and 1.02×λd/(Nd−1). Similarly, if the pitch P5 of the grating pattern of the first diffraction grating 30a is 1.0, the width W10 and the phase height H10 of the second phase grating 31b are respectively 0.04 and 0.01×λd/(Nd−1).

The first diffraction grating 30a including the first and second phase gratings 31a, 31b substantially transmits the laser beam of the 660 nm band for DVDs and diffract the laser beam of the 785 nm band for CDs to produce a main beam and two sub beams. In other words, the first diffraction grating 30a shows the highest diffraction efficiency for the beam of the 0-th order, which is equal to 99.77%, with regard to the incident laser beam of the wavelength of 660 nm. It shows a diffraction efficiency of the beam of the 0-th order (main beam) of 83.54% and that of the beams of the ±1st orders (sub beams) of 4.61% for the incident laser beam of the wavelength of 785 nm. The ratio of the intensity of the diffracted main beam (beam of the 0-th order) to that of the diffracted sub beams (beams of the ±1st order), or the beam of the 0-th order/the beams of the ±1st orders, is equal to 18.11.

Thus, when the laser beam of the 785 nm band for CDs is diffracted by the first diffraction grating 30a to produce three beams, the diffraction grating 30a shows a high diffraction efficiency for the beam of the 0-th order and ensures a diffraction efficiency of 92.7% for the beam of the 0-th order and the beams of the ±1st orders as put together. In other words, it suppresses the generation of any diffracted beams of higher orders other than the beam of the 0-th order and the beams of the ±1st orders. The first diffraction grating 30a can transmit almost all the laser beam of the 660 nm band for DVDs of the 0-th order, or 99%, and suppress the generation of any diffracted beams of higher orders including the ±1st orders for about 0.1%.

Figure 10:
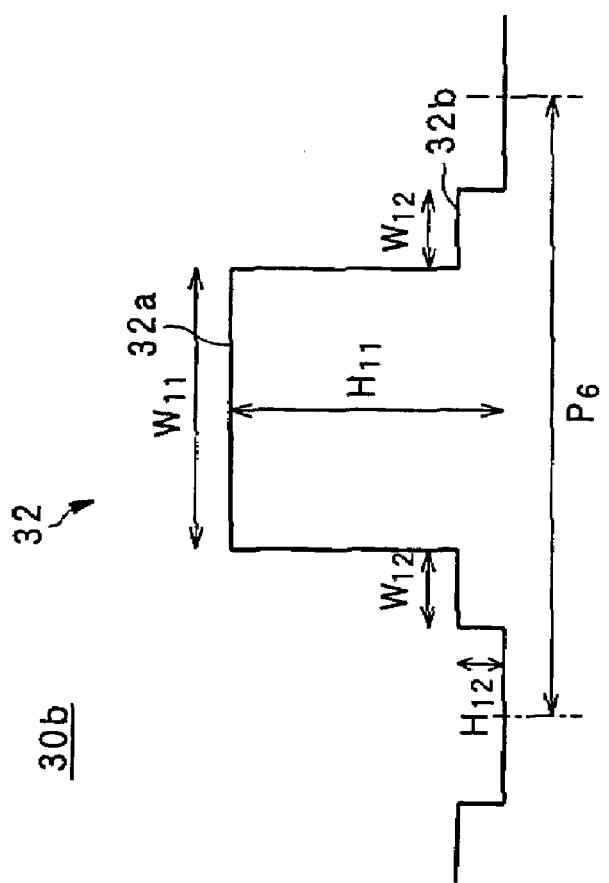
FIG. 10 is a schematic lateral view of the second diffraction grating of the embodiment of composite optical element of FIG. 9.

The second diffraction grating 30b is realized by repetitively forming a micro grating pattern as shown in FIG. 10. Each of the gratings 32 shows a substantially stepped cross section and includes a first phase grating 32a having a width of W11 and a second phase grating 32b formed at opposite sides of the first phase grating 32a like two oppositely disposed steps, each step having a width of W12. The width W11 of the first phase grating 32a is not smaller than 67% and not greater than 75% of the pitch P6 of the grating pattern. If the wavelength of the laser beam of the 785 nm band for CDs is λc and the refractive index when the laser beam of the wavelength λc enters is Nc, the phase height H11 of the first phase grating 32a is not smaller than 0.95 times and not greater than 1.07 times of λc/(Nc−1). The width W12 of the second phase grating 32b arranged at opposite sides of the first phase grating 32a like two oppositely disposed steps is not greater than 15% of the pitch P6 of the grating pattern and the phase height H12 of the second phase grating 32b is not greater than 0.18 times of λc/(Nc−1).

If, for example, the pitch P6 of the grating pattern of the second diffraction grating 30b is 1.0, the width W11 and the phase height H11 of the first phase grating 32a are respectively 0.685 and 0.99×λc/(Nc−1). Similarly, if the pitch P6 of the grating pattern of the second diffraction grating 30b is 1.0, the width W12 and the phase height H12 of the second phase grating 32b are respectively 0.105 and 0.06×λc/(Nc−1).

The second diffraction grating 30b including the first and second phase gratings 32a, 32b substantially transmits the laser beam of the 785 nm band for CDs and diffracts the laser beam of the 660 nm band for DVDs to produce a main beam and two sub beams. In other words, the second diffraction grating 30b shows the highest diffraction efficiency for the beam of the 0-th order (main beam), which is equal to 96.95%, with regard to the incident laser beam of the wavelength of 785nm. It shows a diffraction efficiency of the beam of the 0-th order of 83.91% and that of the beams of the ±1st orders (sub beams) of 5.07% for the incident laser beam of the wavelength of 660 nm. The ratio of the intensity of the diffracted main beam (beam of the 0-th order) to that of the diffracted sub beams (beams of the ±1st order), or the beam of the 0-th order/the beams of the ±1st orders, is equal to 16.54.

Thus, when the laser beam of the 660 nm band for DVDs is diffracted by the second diffraction grating 30b to produce three beams, the diffraction grating 30b shows a high diffraction efficiency for the beam of the 0-th order and ensures a diffraction efficiency of 94% for the beam of the 0-th order and the beams of the ±1st orders put together. In other words, it suppresses the generation of any diffracted beams of higher orders other than the beam of the 0-th order and the beams of the ±1st orders. The second diffraction grating 30b can transmit almost all the laser beam of the 785 nm for CDs, or 97%, and suppress the generation of any diffracted beams of higher orders including the ±1st orders.

In an optical pickup apparatus according to the invention, the composite optical element may be embodied in a manner as described below. In the following description, the components of the optical pickup apparatus 1 that are same as those described above are denoted respectively by the same reference symbols and will not be described any further.

The composite optical element 40 is arranged between the 2-wavelength semiconductor laser element 3 and the beam splitter 5. It is a surface relief type diffraction grating that includes first and second diffraction gratings 40a, 40b arranged respectively at the side of the 2-wavelength semiconductor laser element 3 and at the side of the beam splitter 5 and adapted to split the respective laser beams emitted from the 2-wavelength semiconductor laser element 3 into three beams. The first diffraction grating 40a of the composite optical element 40 arranged at the side of the 2-wavelength semiconductor laser element 3 diffracts the laser beam of the 785 nm band for CDs to produce three beams of the 0-th order and the ±1st orders and transmits substantially all the laser beam of the 660 nm band for DVDs, while the second diffraction grating 40b of the composite optical element 40 arranged at the side of the beam splitter 5 diffracts the laser beam of the 660 nm band for DVDs to produce three beams of the 0-th order and the ±1st orders and transmits substantially all the laser beam of the 785 nm band for CDs.

Figure 11:
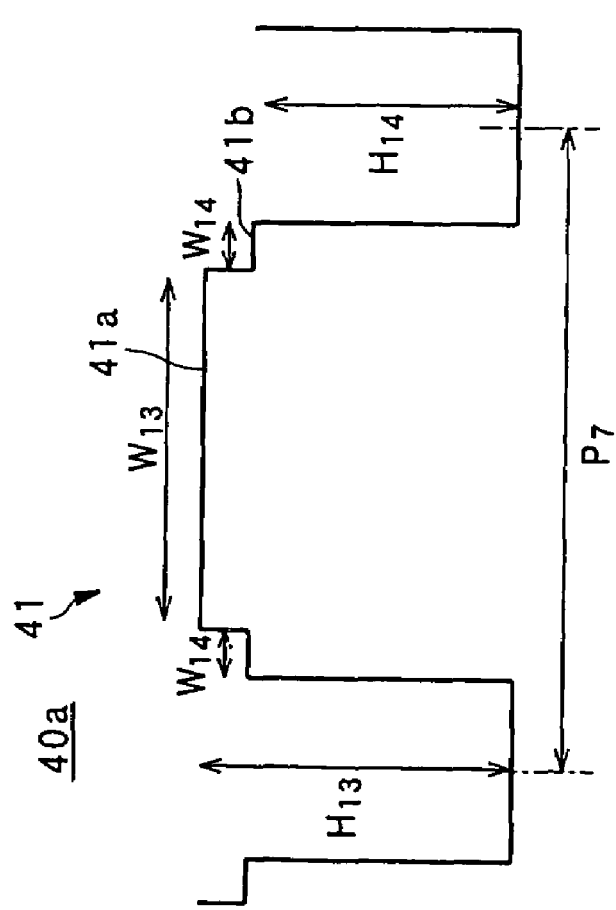
FIG. 11 is a schematic lateral view of the first diffraction grating of still another embodiment of composite optical element.

The first diffraction grating 40a is realized by repetitively forming a micro grating pattern as shown in FIG. 11. Each of the gratings 41 shows a substantially stepped cross section and includes a first phase grating 41a having a width of W13 and a second phase grating 41b formed at opposite sides of the first phase grating 41a like two oppositely disposed steps, each step having a width of W14. The first and second phase gratings 41a, 41b satisfy a relationship of 0.25×P7<(W13+2×W14)<0.39×P7, where P7 is the grating pitch of the grating 41. If the wavelength of the laser beam of the 660 nm band for DVDs is λd and the refractive index of the phase grating 41a when the laser beam of the wavelength λd enters it is Nd, the phase height H13 of the first phase grating 41a is not smaller than 0.89 times and not greater than 1.13 times of λd/(Nd−1)

and the phase height H14 of the second phase grating 41b is not smaller than 0.72 times and not greater than 1.31 times of λd/(Nd−1).

If, for example, the pitch P7 of the grating pattern of the first diffraction grating 40a is 1.0, the width W13 and the phase height H13 of the first phase grating 41a are respectively 0.28 and 1.05×d/(Nd−1). Similarly, if the pitch P7 of the grating pattern of the first diffraction grating 40a is 1.0, the width W14 and the phase height H14 of the second phase grating 41b are respectively 0.02 and 0.9×d/(Nd−1).

The first diffraction grating 40a including the first and second phase gratings 41a, 41b substantially transmits the laser beam of the 660 nm band for DVDs and diffracts the laser beam of the 785 nm band for CDs to produce a main beam and two sub beams. In other words, the first diffraction grating 40a shows the highest diffraction efficiency for the beam of the 0-th order, which is equal to 96.4%, with regard to the incident laser beam of the wavelength of 660 nm. It shows a diffraction efficiency of the beam of the 0-th order (main beam) of 82.77% and that of the beams of the ±1st orders (sub beams) of 4.80% for the incident laser beam of the wavelength of 785 nm. The ratio of the intensity of the diffracted main beam (beam of the 0-th order) to that of the diffracted sub beams (beams of the ±1st order), or the beam of the 0-th order/the beams of the ±1st orders, is equal to 17.26.

Thus, when the laser beam of the 785 nm band for CDs is diffracted by the first diffraction grating 40a to produce three beams, the diffraction grating 40a shows a high diffraction efficiency for the beam of the 0-th order and ensures a diffraction efficiency of 92% for the beam of the 0-th order and the beams of the ±1st orders put together. In other words, it suppresses the generation of any diffracted beams of higher orders other than the beam of the 0-th order and the beams of the ±1st orders. The first diffraction grating 40a can transmit almost all the laser beam of the 660 nm band for DVDs of the 0-th order, or 96%, and suppress the generation of any diffracted beams of higher orders including the ±1st orders.

Figure 12:
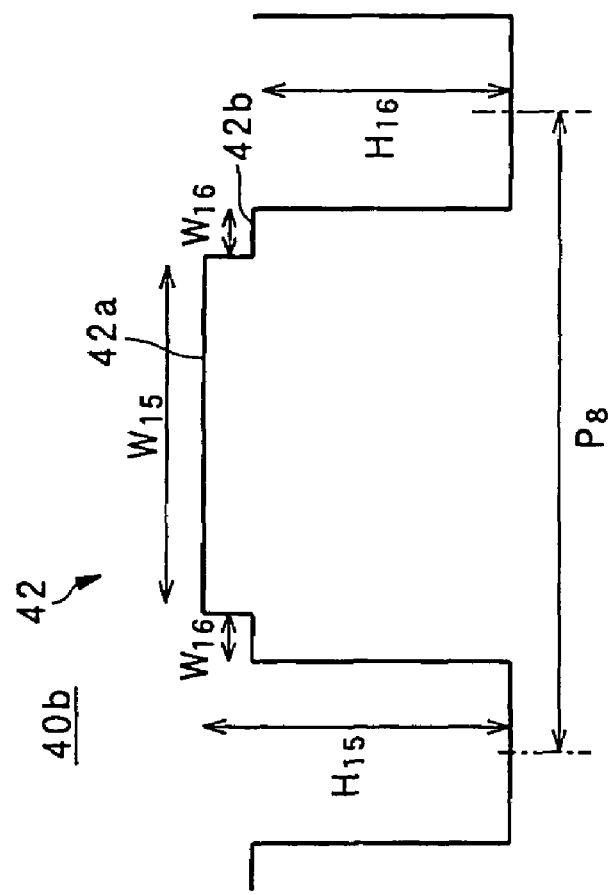
FIG. 12 is a schematic lateral view of the second diffraction grating of the embodiment of composite optical element of FIG. 11.

The second diffraction grating 40b is realized by repetitively forming a micro grating pattern as shown in FIG. 12. Each of the gratings 42 shows a substantially stepped cross section and includes a first phase grating 42a having a width of W15 and a second phase grating 42b formed at opposite sides of the first phase grating 42a like two oppositely disposed steps, each step having a width of W16. The first and second phase gratings 42a, 42b satisfy a relationship of 0.25×P8<(W15+2×W16)<0.33×P8, where P8 is the grating pitch of the grating 42. If the wavelength of the laser beam of the 785 nm band for CDs is λc and the refractive index of the phase grating 42a when the laser beam of the wavelength λc enters it is Nc, the phase height H15 of the first phase grating 41a is not smaller than 0.93 times and not greater than 1.03 times of λc/(Nc−1) and the phase height H16 of the second phase grating 42b is not smaller than 0.78 times and not greater than 1.06 times of λc/(Nc−1).

If, for example, the pitch P8 of the grating pattern of the second diffraction grating 40b is 1.0, the width W15 and the phase height H16 of the first phase grating 42a are respectively 0.215 and 0.97×λc/(Nc−1). Similarly, if the pitch P8 of the grating pattern of the second diffraction grating 40b is 1.0, the width W16 and the phase height H16 of the second phase grating 42b are respectively 0.035 and 0.89×λc/(Nc−1).

The second diffraction grating 40b including the first and second phase gratings 42a, 42b substantially transmits the laser beam of the 785 nm band for CDs and diffracts the laser beam of the 660 nm band for DVDs to produce a main beam and two sub beams. In other words, the second diffraction grating 40b shows the highest diffraction efficiency for the beam of the 0-th order (main beam), which is equal to 96.80%, with regard to the incident laser beam of the wavelength of 785 nm. It shows a diffraction efficiency of the beam of the 0-th order of 84.23% and that of the beams of the ±1st orders (sub beams) of 4.49% for the incident laser beam of the wavelength of 660 nm. The ratio of the intensity of the diffracted main beam (beam of the 0-th order) to that of the diffracted sub beams (beams of the ±1st order), or the beam of the 0-th order/the beams of the ±1st orders, is equal to 18.75.

Thus, when the laser beam of the 660 nm band for DVDs is diffracted by the second diffraction grating 40b to produce three beams, the diffraction grating 40b shows a high diffraction efficiency for the beam of the 0-th order and ensures a diffraction efficiency of 93% for the beam of the 0-th order and the beams of the ±1st orders put together. In other words, it suppresses the generation of any diffracted beams of higher orders other than the beam of the 0-th order and the beams of the ±1st orders. The second diffraction grating 40b can transmit almost all the laser beam of the 785 nm band for CDs of the 0-th order, or 97%, and suppress the generation of any diffracted beams of higher orders including the ±1st orders.

With any of the above described composite optical elements 20, 30, 40, the laser beam of the wavelength adapted to be transmitted through the first diffraction grating 20a, 30a or 40a or the second diffraction grating 20b, 30b or 40b does not give rise to any laser beams of the ±1st orders when detecting the tracking error signal and hence it is possible to raise the ratio of the intensity of the diffracted main beam to that of the diffracted sub beams, or the beam of the 0-th order/the beams of the ±1st orders, that are the three beams produced as a result of diffraction. Additionally, since diffracted beams of higher orders are practically not generated at all, it is possible to raise the efficiency of utilization of the lasers of the optical pickup apparatus 1 and accurately detect tracking errors by means of three beams.

In an optical pickup apparatus and an optical disc apparatus according to the invention, the 2-wavelength semiconductor laser element can emit various laser beams of different wavelengths, which can be used selectively depending on the type of the optical disc 8 to be used with the apparatus. In other words, laser beams that the 2-wavelength semiconductor laser element can emit are not limited to those of the wavelengths of 660 nm and 785 nm. For example, the 2-wavelength semiconductor laser element may be adapted to emit a laser beam of a short wavelength of about 400 nm that is shorter than the wavelength of 660 nm for DVDs. If such is the case, the first and second diffraction gratings formed in the composite optical element 4 are designed to show a duty ratio and a phase height that can transmit a laser beam of a wavelength of about 400 nm and split it into three beams that shows a ratio of the intensity of the diffracted main beam to that of the diffracted sub beams, or the beam of the 0-th order/the beams of the ±1st orders, found within a predetermined range.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup apparatus, comprising:
  a light emitting section for emitting a first laser beam having wavelength λ1 and a second laser beam having wavelength λ2 different from the wavelength λ1;
  a surface relief type first diffraction grating having a phase height of two steps produced by being equipped with a first phase grating and a second phase grating arranged at opposite sides of the first phase grating and adapted to split the laser beam of the wavelength λ1 into three beams and transmit substantially all of the laser beam of the wavelength λ2;

a surface relief type second diffraction grating having a phase height of two steps produced by being equipped with a first phase grating and a second phase grating arranged at opposite sides of the first phase grating and adapted to split the laser beam of the wavelength λ2 into three beams and transmit substantially all of the laser beam of the wavelength λ1;

an objective lens for converging the laser beams emitted from the light emitting section onto an optical disc;

an optical element for branching optical paths of return light reflected by the optical disc; and a light receiving section for receiving the return light branched by the optical element, wherein the light emitting section emits a first laser beam having a wavelength λ1 of about 660 nm and, the first diffraction grating includes a first phase grating having a width not smaller than 62% and not greater than 75% of the pitch of the diffraction grating and a phase height not smaller than 1.01 times and not greater than 1.24 times of λ1/(N1−1) and a second phase grating arranged at opposite sides of the first phase grating and having a width not greater than 19% of the pitch of the diffraction grating and a phase height not smaller than 0.34 times of λ1/(N1−1), where N1 being the refractive index for the laser beam of the wavelength of λ1 entering the diffraction grating.

2. An optical pickup apparatus, comprising:

a light emitting section for emitting a first laser beam having wavelength λ1 and a second laser beam having wavelength λ2 different from the wavelength λ1;

a surface relief type first diffraction grating having a phase height of two steps produced by being equipped with a first phase grating and a second phase grating arranged at opposite sides of the first phase grating and adapted to split the laser beam of the wavelength λ1 into three beams and transmit substantially all of the laser beam of the wavelength λ2;

a surface relief type second diffraction grating having a phase height of two steps produced by being equipped with a first phase grating and a second phase grating arranged at opposite sides of the first phase grating and adapted to split the laser beam of the wavelength λ2 into three beams and transmit substantially all of the laser beam of the wavelength λ1;

an objective lens for converging the laser beams emitted from the light emitting section onto an optical disc;

an optical element for branching optical paths of return light reflected by the optical disc; and a light receiving section for receiving the return light branched by the optical element, wherein the light emitting section emits a second laser beam having a wavelength λ2 of about 785 nm, and the second diffraction grating includes a first phase grating having a width W1 and a second phase grating arranged at opposite sides of the first phase grating and having a width W2, the widths satisfying a relationship of 0.67×P<(W1+2×W2)<0.89×P, where P being the pitch of the diffraction grating, the first phase grating and the second phase grating having respective phase heights not smaller than 0.93 times and not greater than 1.06 times of λ2/(N2−1) and not smaller than 0.74 times and not greater than 1.06 times of λ2/(N2−1), where N2 being the refractive index for the laser beam of the wavelength of λ2 entering the diffraction grating.

* * * * *